Aug. 1, 1967  A. BIOLIK  3,333,286
ADJUSTABLE SICK-BED BOLSTER
Filed Jan. 20, 1966  5 Sheets-Sheet 1

INVENTOR
ALEXANDER BIOLIK
BY
ATTORNEY.

Aug. 1, 1967

A. BIOLIK 3,333,286

ADJUSTABLE SICK-BED BOLSTER

Filed Jan. 20, 1966

INVENTOR
ALEXANDER BIOLIK
BY

ATTORNEY.

Aug. 1, 1967  A. BIOLIK  3,333,286
ADJUSTABLE SICK-BED BOLSTER
Filed Jan. 20, 1966  5 Sheets-Sheet 4

INVENTOR
ALEXANDER BIOLIK
BY
ATTORNEY.

United States Patent Office 3,333,286
Patented Aug. 1, 1967

3,333,286
ADJUSTABLE SICK-BED BOLSTER
Alexander Biolik, Marsstrasse 14, Munich, Germany
Filed Jan. 20, 1966, Ser. No. 521,924
Claims priority, application Germany, Feb. 5, 1965,
B 80,510
16 Claims. (Cl. 5—327)

ABSTRACT OF THE DISCLOSURE

An adjustable sick bed bolster which comprises at least two bolster sections and is in its longitudinal section of a substantially trapeziform basic shape. The bolster has a horizontal base surface, a shorter horizontal top surface, a vertical rear-end surface, and an inclined front-end surface extending at an angle from the front end of the base surface to the front end of the top surface. The bolster is divided into at least two wedge-shaped bolster sections along a partition plane extending from a horizontal center-line of the inclined front-end surface in an angular upward direction to an upper rear edge line of the vertical rear-end surface, and the lower of the bolster sections has a trapeziform longitudinal section and the upper of the bolster sections has a substantially triangular longitudinal section.

---

The present invention relates to an adjustable sick-bed bolster comprising at least two bolster sections capable of being arranged in different combinations, and serving to support any desired part of the body of a patient or person resting, or to place individual parts of the body, particularly the legs, in a more or less elevated position.

Known to the art is an adjustable mattress in which a mattress strip of rectangular cross-sectional form is pivotally connected with a mattress front section and can be folded upwards from the mattress plane. A mattress of such design is intended to remedy conditions of somnipathy, the folded-up mattress strip supporting only the forehead of the patient lying prone. However, such adjustable mattress is neither intended nor suitable for placing other parts of the body in any desired elevated position.

It is one object of the present invention to provide an adjustable sick-bed bolster for use on any kind of bed or couch or the like, which in a simple manner permits supporting the body in numerous different ways and keeping any part of the body in any desired elevated position.

It is another object of the present invention to provide an adjustable sick-bed bolster which, in its longitudinal section, is of roughly trapeziform and has a horizontal base surface, a shorter horizontal top surface, a vertical rear-end surface, and an inclined front-end surface extending from the front end of the base surface to the front end of the top surface, such bolster being divisible along a partition plane extending from the horizontal centerline of the inclined front-end surface in an angular upward direction to an upper rear edge line of the vertical rear-end surface to form two wedge-shaped bolster sections, the lower of which having a trapeziform and the upper having a substantially triangular longitudinal section.

It is still another object of the present invention to provide an adjustable sick-bed bolster which comprises two wedge-shaped bolster sections which can be pivotally connected with one another by a hinge arrangement extending along the horizontal centerline of the inclined front-end surface of the bolster, for example by means of a zipper serving as a hinge mechanism and permitting complete separation of the two bolster sections. Moreover, each of these bolster sections may, in turn, be arranged for further partition along suitable partition planes, it being understood, however, that all bolster sections if put together always make up the trapeziform of the bolster as a whole.

The invention thus makes it possible to use the sick-bed bolster either as a wedge-like support in its trapeziform or, after folding down the wedge-shaped upper section, as a flat and long bolster support, as may be dictated by medical, orthopedic, surgical or other requirements. In the latter case, due to partition of the trapeziform bolster along a partition plane extending from the horizontal centerline of the inclined front-end surface of the bolster in an angular upward direction to the upper rear edge line of the vertical rear-end surface, provision is made for the inclined upper surface of the flat and long bolster support to be free of steps and have the same angle of inclination over its entire length. On the other hand, the two bolster sections may likewise be used as separate units. Other combinations can be obtained by dividing the upper, triangular bolster section into two halves capable of being moved independently of each other, for example for providing different elevation levels for supporting the legs. Still other favorable variations will result from the additional provision of a rectangular extension unit arranged for attachment to the vertical rear-end surface of the trapeziform bolster and composed of two transverse sections divided along a diagonal partition plane.

These wedge-shaped transverse units enable additional elevations to be obtained, either on one or on both sides. It will be obvious that a bolster according to the present invention will, for all practical purposes, easily meet almost all demands that may be made by a physician or by a patient with respect to the positioning of the body or any part or parts thereof. The bolster of the present invention may also be advantageously employed outside the hospital either by doctors or by private persons, for example for daily use in bed or any similar place of rest for the purpose of elevating tired legs, preventing blood congestion, treating circulatory disorders and conditions caused by slipped disks, disk lesions, etc. In the last-mentioned case, the support surfaces of the bolster sections may, according to another embodiment of the present invention, be reinforced by plates made of a hard material to provide greater rigidity. Electric cushion heating elements may be installed in the place of the hard plate reinforcements to permit thermal treatment of blood congestion and other conditions. Similarly, the bolster sections may be provided with a suitable container filled with a liquid, so as to permit the application of special steam or vapor baths for the legs. Finally, for special therapeutic treatment, the bolster may have built-in vibrator elements.

The bolster sections and units may, for example, be made of a foam plastic or foamed rubber or any similar material. Arrangements for separating the various sections may be omitted in part or altogether. In accordance with a preferred embodiment of the present invention the bolster sections are enveloped in removable protective covers made of any suitable fabric or washable plastic. In this case it is expedient to fit the articular connecting means to such covers, preferably in the form of fully separable zippers.

It is yet another object of the present invention to provide an adjustable sick-bed bolster which includes a special carrying bag designed for the sole purpose of providing a hygienic and convenient means of transporting the trapeziform bolster.

It is a further object of the present invention to provide an adjustable sick-bed bolster which includes a carrying bag which comprises a rectangular bag-like container being open at the top and capable of being suitably adapted to the trapeziform of the bolster in that the upper rim of the bag is folded to the inside, the lengthwise projecting part of the bag is folded in the manner of a closing flap and secured by patent fasteners. By so doing, the two laterally disposed angular sections are urged into position and clamped. Two strap handles are provided, one on each side of the bag, the handle on the inclined side being slightly longer than the other to ensure that both handles are at the same height for carrying.

With these and other objects in view which will become apparent in the following detail description, the present invention will be clearly understood in connection with the accompanying drawings, in which.

Figure 1:
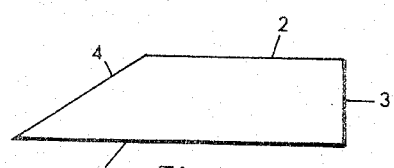
FIGURE 1 is a side elevation of the basic form of a bolster, according to the present invention.
Figures 2, 2A, 2B:
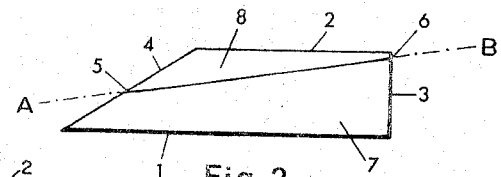
FIG. 2 is a side elevation of a bolster composed of two wedge-shaped bolster sections.
FIG. 2a is a section of a bolster comprising hollow bodies.
FIG. 2b is a section of a bolster comprising hollow cavities.
Figure 3:
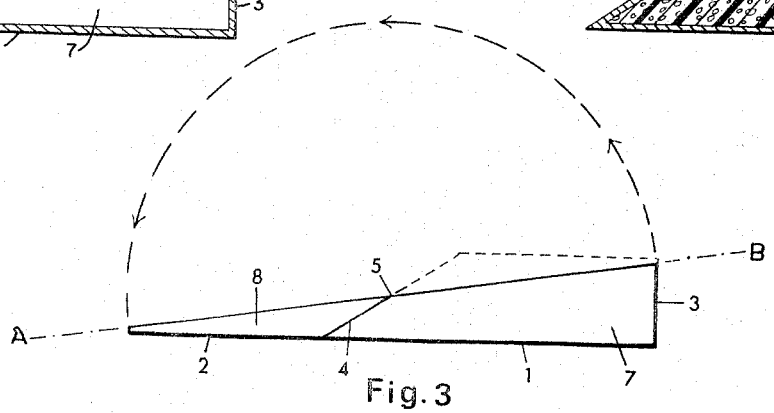
FIG. 3 is a side elevation of the bolster shown in FIG. 2, with the upper bolster section folded down.
Figure 4:
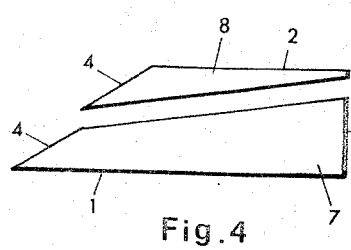
FIG. 4 is a side view of the wedge-shaped bolter sections in separated condition.
Figure 5:
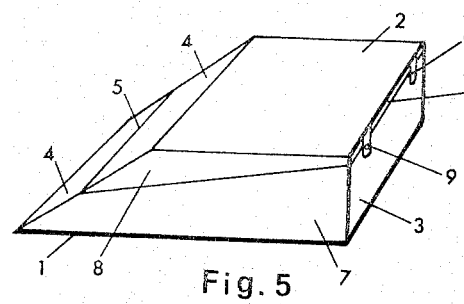
FIG. 5 is a perspective side view of a bolster composed of two wedge-shaped bolster sections.
Figure 6:
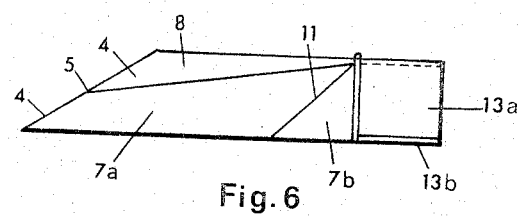
FIG. 6 is a side elevation of another embodiment of the bolster, with the lower section being subdivided and with a diagonally partitioned extension unit.
Figure 7:
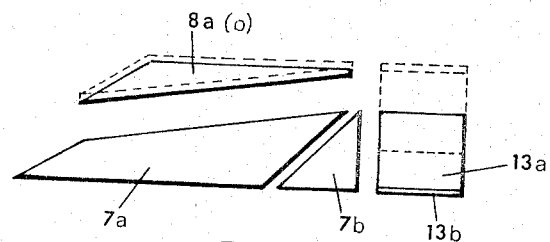
FIG. 7 is a side elevation of the bolster sections and units shown in FIG. 6 in separated condition.
Figure 8:
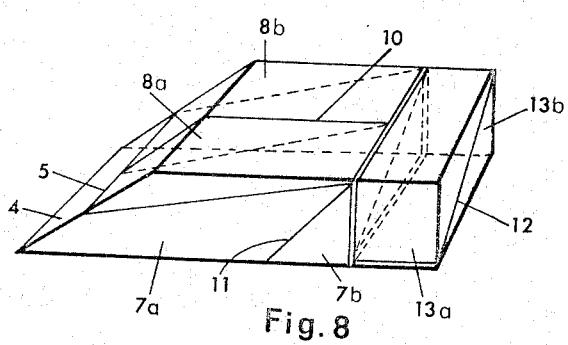
FIG. 8 is a perspective side view of a modification of the bolster, having a longitudinally divided upper section.
Figure 9:
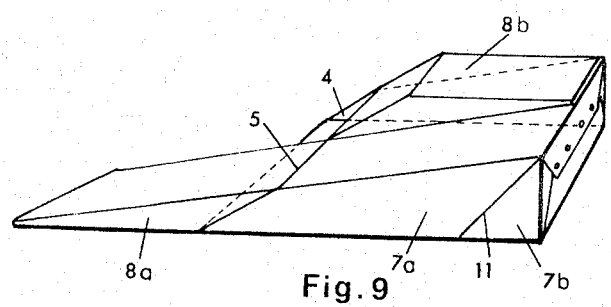
FIGS. 9 to 11 are perspective side views of various combinations obtainable by using the bolster of the present invention.
Figure 10:
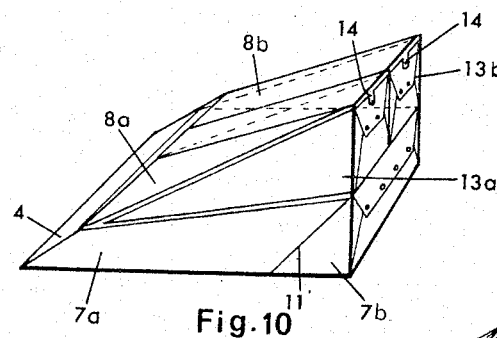
Figure 11:
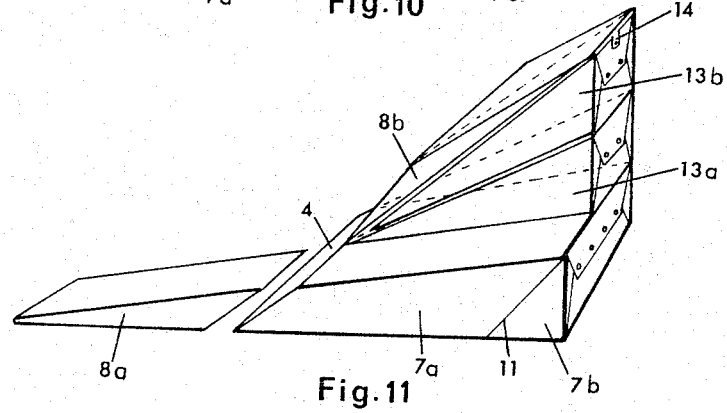

Referring now to the drawings, and in particular to FIGS. 1 to 5, in longitudinal section, the bolster has a substantially trapeziform, possessing a horizontal base surface 1, a top surface 2 extending parallel thereto, a vertical rear-end surface 3, and an inclined front-end surface 4. This bolster can be divided into two wedge-shaped bolster sections 7 and 8 along a partition plane A–B extending from the horizontal centerline 5 of the inclined front-end surface 4 in an angular upward direction to a rear upper edge line 6 of the vertical rear-end surface 3. By moving the upper bolster section 8 through 180° about the centerline 5, along the circular arc indicated in FIG. 3 and provided with arrows showing the direction of movement, the bolster sections form a flat, wedge-shaped support having a base surface of 1, 2, an inclined top surface lying in the plane A–B, and a vertical rear-end surface 3. The two wedge-shaped bolster sections 7 and 8 are preferably articulated along the centerline 5 to permit a folding movement, but can also be completely separated from one another as shown in FIG. 4.

The bolster sections may, for example, be made of an elastic material such as foamed rubber or foam plastic. Each of them is enveloped in a removable protective cover (not shown) made of fabric or washable plastic, and both of them are connected with each other along the centerline 5 by means of a fully separable zipper or any other hinge-like mechanism or means. This zipper or hinge-like mechanism constitutes the axis of articulation for folding the bolster sections 7 and 8 relative to one another. In the trapeziform, i.e., when lying one on top of the other, the two wedge-shaped sections 7 and 8 may be held together by means of button-type fasteners 9 (FIG. 5) provided on the rear-end surface 3.

Referring now again to the drawings, and in particular to FIGS. 6 to 10, the wedge-shaped bolster section 8 can be subdivided into two halves 8a, 8b, being divided along a vertical partition plane coinciding with the longitudinal centerline 10. These two halves may either be used independently from one another or be combined with the wedge-shaped bolster section 7, as may be required. Similarly, the bolster section 7 can be subdivided into a larger portion 7a having a substantially trapeziform in longitudinal section, and a smaller portion 7b of approximately triangular shape in longitudinal section, the division being along an inclined partition plane extending through the line 11 and being located adjacent to the end near the rear-end surface 3.

Finally, the length of the bolster can be increased by an extension unit which can be attached to the rear-end surface 3 of the bolster and which, in turn, is subdivided into two transverse wedge-shaped sections 13a, 13b, the partition plane extending essentially along the transverse diagonal 12.

All individual sections may be enveloped in special protective covers; but provision can also be made for parts belonging together, such as sections 7a, 7b, to be accommodated in a common cover. Displacement of bolster sections arranged in a particular position can be prevented with the aid of fastening strips or clasps 14.

Figure 12:
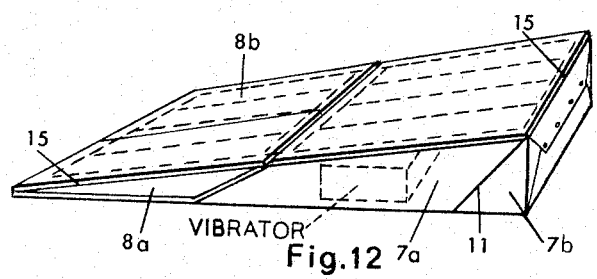
FIG. 12 is a perspective side view of a further embodiment of the bolster.
Figure 13A:
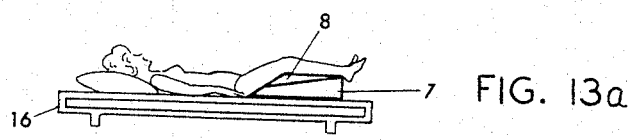
FIGS. 13a to 13h show diagrammatic side views of typical applications of the bolster of the present invention.
Figure 13B:
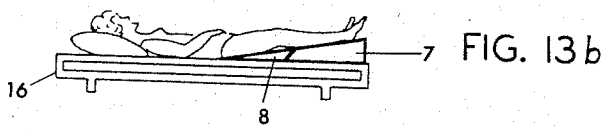
Figure 13C:
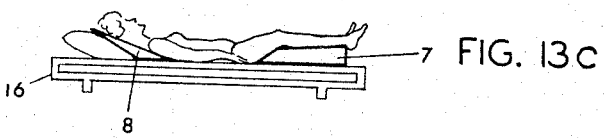
Figure 13D:
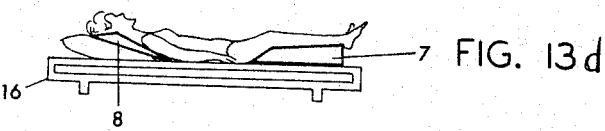
Figure 13E:
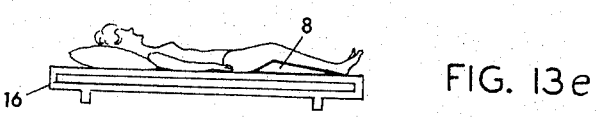
Figure 13F:
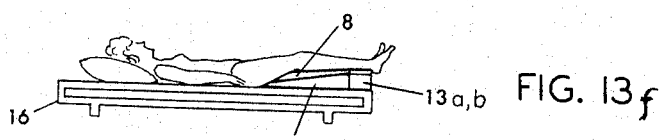
Figure 13G:
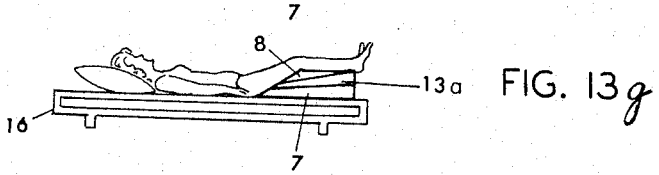
Figure 13H:

To cater for special surgical or orthopedic requirements, e.g. the elevation of a leg encased in plaster of Paris or the treatment of conditions resulting from slipped disks or disk lesions, hard plates 15 may be used to provide a hard support surface, such as is shown in FIG. 12 on the example of the long and flat bolster arrangement.

Such hard plates 15 may consist of wood, metal or plastic, and may be either glued on to the bolster material or inserted into the protective cover of the bolster section concerned. The bolster sections may also be made of such materials as cork, hay straw, a system of wire springs, or the like, or be designed in the form of hollow bodies made of metal, wood, plastic, rubber-coated fabric or the like; in the last mentioned case provision (not shown) may be made for inflating air into them. The edges of the bolster sections may be strengthened by means of wires or small-diameter tubing and may be of the pull-out type. Moreover, the bolster sections may be made in the form of wire frames covered with fabric or gauze wire.

FIGS. 13a to 13h disclose a plurality of examples for using a bolster of the present invention, the various bolster sections being arranged in different combinations on a couch 16.

Figure 14:
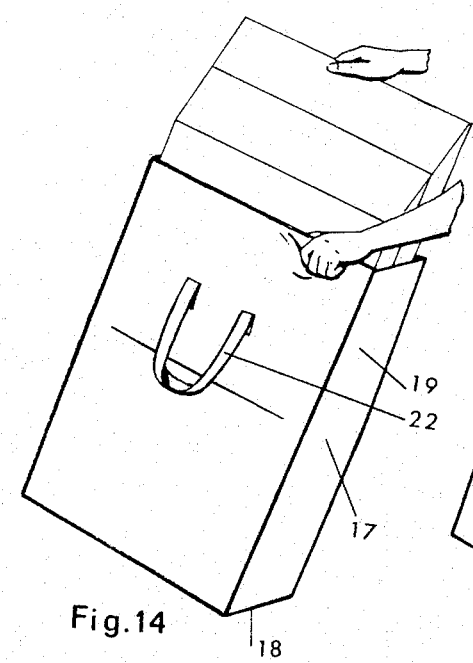
FIG. 14 is a perspective front view of the rectangular carrying bag with partly extending bolster.
Figure 15:
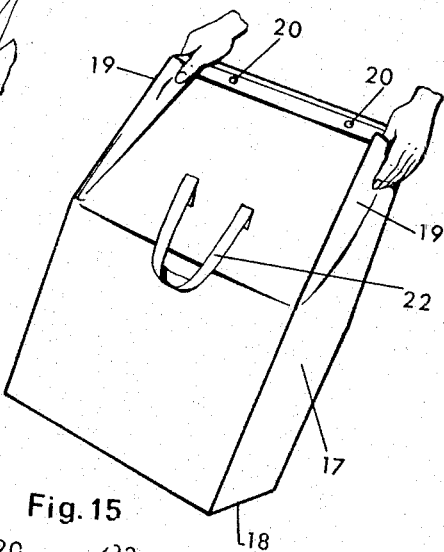
FIG. 15 is a perspective front view of the carrying bag with completely inserted bolster showing the closure mechanism open on the side of the inclined bolster surface.
Figure 16:
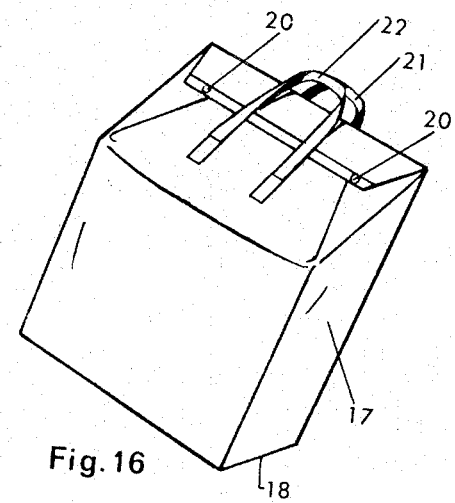
FIG. 16 is a perspective front view of the fully closed carrying bag, indicating the trapeziform of the bag, complementary to that of the bolster.

Referring now again to the drawings, and in particular to FIGS. 14, 15 and 16, the carrying bag comprises an oblong, rectangular bag-like container 17 having a level bottom surface 18 and being provided, at the upper end of each of the two narrow lateral parts thereof, with the lower part of a snap fastener 19, and, at the upper seam end of the outer broad side thereof, with the upper parts of two snap fasteners 20. Attached to that side of the bag provided with the snap fasteners 20 is the shorter of two strap handles 21, while the longer of the two strap handles 22 is attached to the opposite outer side of the bag.

FIG. 14 shows the bolster of the present invention being partly inserted into the accurately sized bag container.

FIG. 15 shows how one side of the bag is folded against the inclined surface of the trapeziform bolster, the angular portions 19 of the lateral bag parts being folded to the inside.

Finally, FIG. 16 shows the carrying bag in its closed position with the two strap handles 21 and 22 extending to the same height for convenient carrying.

Since the application of heat may be required to a particular part of the human body in some instances, electric heating elements 16 can be secured to the surfaces of the bolster sections.

Furthermore, it may be of advantage to provide the bolster sections with hollow cavities for different purposes.

It is, however, possible to form each of the bolster sections as a single hollow body, the surfaces of which may be pervious to steam or vapors.

Finally, it may be also required to subject some particular body portions to vibrations and in order to bring about such result, built-in vibrator elements of conventional structure may be secured to the surfaces of the bolster sections.

While I have disclosed several embodiments of the present invention, it is to be understood that these embodiments are given by example only and not in a limiting sense, the scope of the present invention being determined by the objects and the claims.

I claim:

1. An adjustable sick-bed bolster, comprising
   at least two bolster sections being in its longitudinal section of a substantially trapeziform,
   said bolster having a horizontal base surface, a shorter horizontal top surface, a vertical rear-end surface, and an inclined front-end surface extending at an angle from the front end of said base surface to the front end of said top surface,
   said bolster being divided into at least two wedge-shaped bolster sections along a partition plane extending from a horizontal centerline of said inclined front-end surface in an angular upward direction to an upper rear edge line of said vertical rear-end surface, and
   the lower of said bolster sections having a trapeziform longitudinal section and the upper of said bolster sections having a substantially triangular longitudinal section.

2. The sick-bed bolster, as set forth in claim 1, wherein
   said lower, trapeziform bolster section is pivotally connected with said upper, substantially triangular bolster section for a folding movement, and
   a hinge means extending along said horizontal centerline of said inclined front-end surface of the bolster and operatively secured to the engaging edge sections of said wedge-shaped bolster sections.

3. The sick-bed bolster, as set forth in claim 2, wherein
   said hinge means comprises fully separable zippers.

4. The sick-bed bolster, as set forth in claim 1, wherein
   said upper, substantially triangular bolster section is divided into two independently movable bolster section halves along a partition plane coinciding with a longitudinal centerline of said upper, substantially triangular bolster section.

5. The sick-bed bolster, as set forth in claim 1, wherein
   said lower, trapeziform bolster section is divided into a larger trapeziform portion and a smaller portion triangular in cross-section along an inclined partition plane extending along a rear angular partition line of said lower, trapeziform bolster section.

6. The sick-bed bolster, as set forth in claim 1, which includes
   an extension unit immediately adjacent to said vertical rear-end surface of said bolster,
   said extension unit comprising two transverse wedge-shaped portions obtained by dividing said extension unit along an inclined partition plane coinciding with a transverse diagonal thereof.

7. The sick-bed bolster, as set forth in claim 1, wherein
   said surfaces of said bolster sections include hard plates, in order to reinforce said surfaces for greater rigidity.

8. The sick-bed bolster, as set forth in claim 1, which includes
   removable protective covers enveloping said bolster sections.

9. The sick-bed bolster, as set forth in claim 1, which includes
   electric heating elements secured to said surfaces of said bolster sections.

10. The sick-bed bolster, as set forth in claim 1, wherein
    said bolster sections have hollow cavities.

11. The sick-bed bolster, as set forth in claim 1, wherein
    said bolster sections comprise a hollow body having a surface pervious to steam or vapors.

12. The sick-bed bolster, as set forth in claim 1, which includes
    built-in vibrator elements secured to the surfaces of said bolster sections.

13. The sick-bed bolster, as set forth in claim 1, which includes
    a carrying bag comprising a container having an oblong, rectangular shape and open at its top,
    said container having a level bottom, a front panel, a rear panel and two narrow lateral portions,
    two fasteners secured to said lateral portions, and
    two strap handles of different lengths secured to said front panel and to said rear panel, respectively.

14. The sick-bed bolster, as set forth in claim 13, wherein
    one seam end of each of said narrow lateral portions of said container is provided with the lower part of a snap fastener.

15. The sick-bed bolster, as set forth in claim 13, wherein
    the outer side of the upper seam end, opposite the opening of said container, is provided with the upper parts of two snap fasteners.

16. The sick-bed bolster, as set forth in claim 13, wherein
    the shorter of said strap handles is attached to the snap fastener side of said container, in the upper third thereof, and the longer of said strap handles is attached to the other external side of said container.

References Cited

UNITED STATES PATENTS

| 2,247,667 | 7/1941 | Rosberger | 5—357 |
| 2,290,598 | 7/1942 | Lumia | 5—357 |
| 3,204,678 | 9/1965 | Worcester | 5—341 |

FOREIGN PATENTS

| 546,541 | 4/1956 | Belgium. |
| 340,323 | 9/1959 | Switzerland. |

DAVID J. WILLIAMOWSKY, Primary Examiner.

R. D. KRAUS, Examiner.